Feb. 5, 1929.

E. L. HOUGH 1,701,370

CONTROL APPARATUS

Filed Oct. 16, 1926

Inventor:
Eugene L. Hough,
by
His Attorney.

Patented Feb. 5, 1929.

1,701,370

UNITED STATES PATENT OFFICE.

EUGENE L. HOUGH, OF SCHENECTADY, NEW YORK, ASSIGNOR TO GENERAL ELECTRIC COMPANY, A CORPORATION OF NEW YORK.

CONTROL APPARATUS.

Application filed October 16, 1926. Serial No. 142,104.

My invention relates to control apparatus, and has for its principal object the provision of an improved apparatus for controlling the operation of a vapor electric device such as a mercury arc rectifier arranged to be connected between alternating and direct current circuits.

It is desirable that the temperature of a mercury rectifier be above a predetermined value when its operation is started, that this temperature be maintained within predetermined limits during the operation of the rectifier, that the rectifier be deenergized if its temperature becomes excessive, and that there be produced and maintained in the vicinity of the rectifier cathode a supply of ionized vapor which facilitates the transmission of load current between the main cathode and the main anodes of the rectifier. In accordance with my invention, these and other results are effected in response to energization of a temperature control element subjected to substantially the same temperature as the rectifier.

My invention will be better understood from the following description when considered in connection with the accompanying drawings and its scope will be pointed out in the appended claims.

Figure 1:
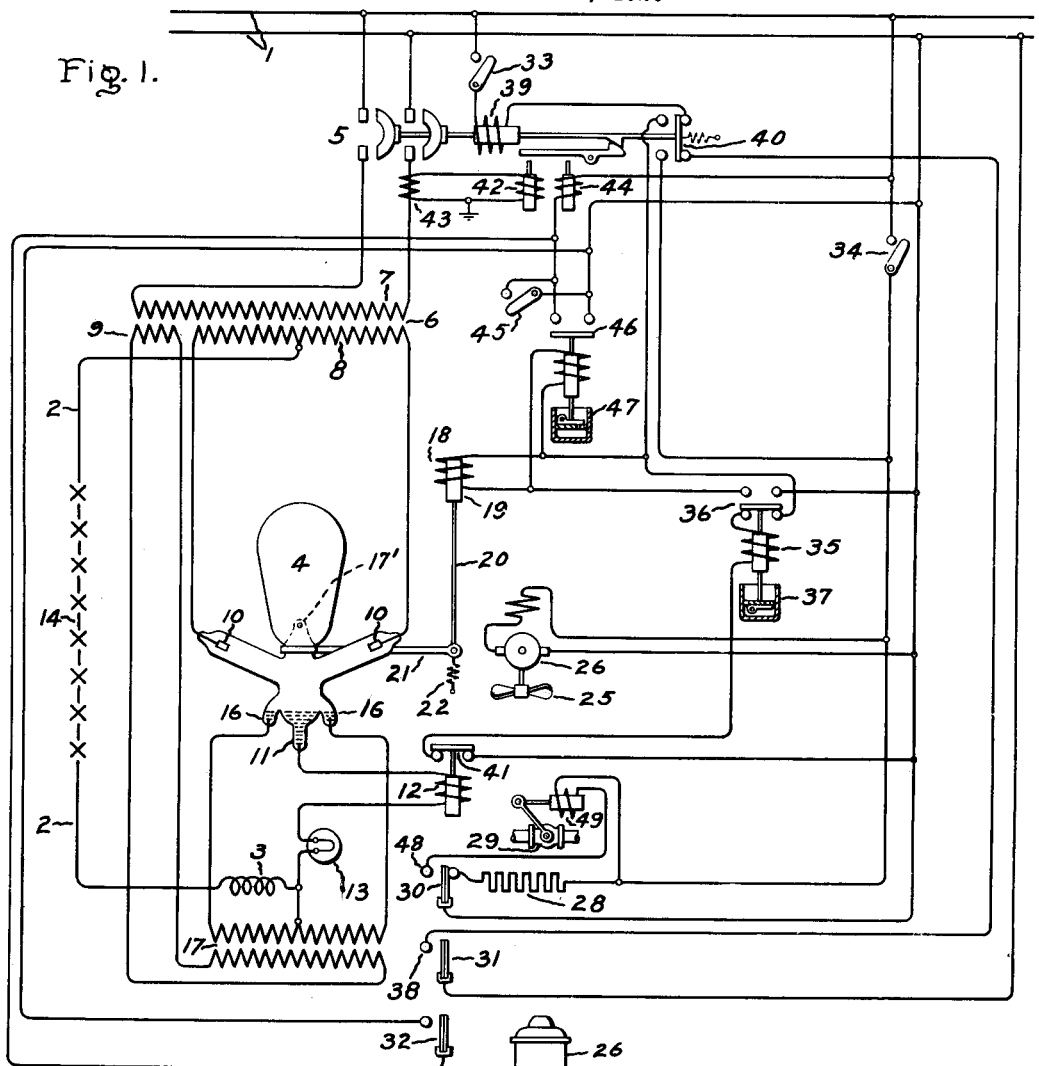
Figure 2:
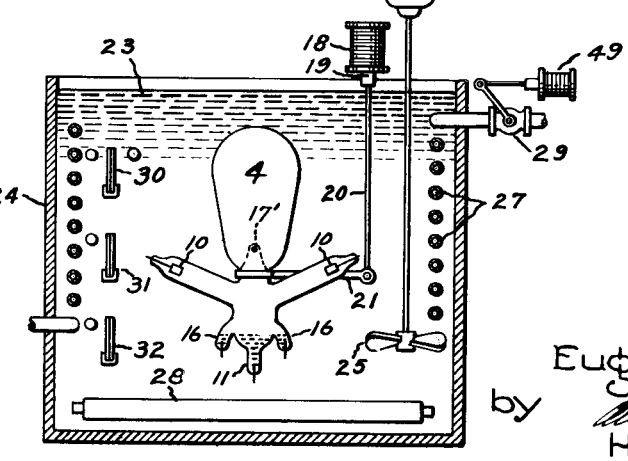

Referring to the drawings, Fig. 1 illustrates a control apparatus wherein my invention has been embodied; and Fig. 2 illustrates certain details in the arrangement and construction of this apparatus.

Fig. 1 shows an alternating current circuit 1 and a direct current circuit 2, which are arranged to be interconnected through means comprising a smoothing reactor 3, a mercury arc rectifier 4, a main circuit breaker 5 and a main transformer 6, which includes a primary winding 7, and secondary windings 8 and 9. The rectifier 4 comprises main anodes 10, which are connected to the end terminals of the winding 8, a mercury cathode 11, which is connected through a switch operating coil 12, an indicating device 13, the smoothing reactor 3, and a load 14 to the winding 8 at a point intermediate its ends, and exciting electrodes 16, which are connected to the cathode 11 through opposite halves of a transformer 17 supplied with current from the secondary winding 9. Shaking or tilting of the rectifier to establish an exciting arc between the cathode 11 and the existing anodes 16 is effected by rocking the rectifier about a pivot 17'. This result is produced through a solenoid comprising an operating coil 18 and a core 19, which is mechanically connected to the rectifier through members 20 and 21 and is biased to its illustrated position by a spring 22.

As indicated by Fig. 2, the rectifier 4 is submerged in a fluid 23, such as oil, contained in a vessel 24. A mixer 25 operated by a motor 26 is provided for equalizing the temperature of this fluid at various points within the vessel. This temperature is regulated by a cooling medium circulated through a coiled pipe 27 and by a heating element 28. Control of the heater 28 and a valve 29 through which the cooling medium is admitted to the coil 27 is effected by means of a thermostatic element 30 mounted within the tank 24. Also mounted within the vessel 24 are a thermostatic element 31, which causes the circuit breaker 5 to be closed when the temperature of the rectifier has attained a predetermined value and a thermostatic element 32 which causes the circuit breaker 5 to be opened when the temperature of the rectifier becomes too high for safe operation. Current for operating the control equipment of the apparatus is supplied from the alternating current line 1 through switches 33 and 34.

Assuming the line 1 to be energized, the switches 33 and 34 to be closed, and the other parts of the apparatus to be as illustrated, current is supplied to the heater 28. When the heater 28 has raised the temperature of the rectifier to a predetermined value, the thermostatic element 31 is operated into engagement with a contact 38, thus connecting a closing coil 39 of the breaker 5 to the line 1 through an auxiliary contact 40 and causing this breaker to be operated to its closed position. Under these conditions current is supplied to the operating coil 35 of a switch 36 which is operated to its upper closed position instantaneously and opens after a time delay determined by a timing element 37, the shaker operating coil 18 is connected to the line 1 through the auxiliary contact 40 and the switch 36, the rectifier is tilted in a manner to produce temporary contact between the cathode 11 and the exciting electrodes 16, and the exciting arc of the rectifier is established, thus energizing the operating coil 12 of a switch 41 and deenergizing both the operating coil 35 of the switch 36 and the shaker operating coil 18.

During operation of the rectifier, opening of the main circuit breaker 5 may be produced either by a trip coil 42 which is supplied with current from a current transformer 43 connected in the supply line of the rectifier 4 or by a trip coil 44 which is arranged to be connected to the line 1 through the thermostatic element 32, through a switch 45, or through a switch 46, which is arranged to close if the shaker operating coil is not deenergized within a time interval determined by a timing element 47. The thermostatic element 30 is so arranged that it is in its illustrated position when the rectifier temperature is too low, is in its mid or neutral position when the temperature of the rectifier is normal, and is in engagement with a contact 48 when the temperature of the rectifier is too high. When the thermostatic element engages the contact 48 a circuit is completed between the circuit 1 and an operating coil 49 which controls the opening of the valve 29 through which the cooling medium is admitted to the coil 27.

A rectifier thus has its temperature regulated by the thermostatic element 30, is protected against overheating by the thermostatic element 32, is protected against excessive load by the trip coil 42, is protected against failure of its exciting arc by switches 41 and 36, and is protected against undue delay in the starting of the exciting arc by the switch 46.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States is:—

1. The combination of an alternating current circuit, a vapor electric device comprising an anode and a cathode and provided with an exciting electrode arranged to produce a supply of ionized vapor in the vicinity of said cathode, means for regulating the temperature of said rectifier, and means operable at a predetermined value of said temperature to connect said anode to said circuit and to establish an arc between said cathode and said exciting electrode.

2. The combination of an alternating current circuit, a vapor electric device comprising an anode and a cathode and provided with an exciting electrode arranged to produce a supply of ionized vapor in the vicinity of said cathode, means for regulating the temperature of said rectifier, means operable at a predetermined value of said temperature to connect said anode to said circuit and to establish an arc between said cathode and said exciting electrode, and means operable to disconnect said anode from said circuit in response to a predetermined rise in said temperature.

3. The combination of an alternating current circuit, a vapor electric device comprising an anode and a cathode and provided with on exciting electrode arranged to produce a supply of ionized vapor in the vicinity of said cathode, means for regulating the temperature of said rectifier, means operable at a predetermined value of said temperature to connect said anode to said circuit and to establish an arc between said cathode and said exciting electrode, and means operable to disconnect said anode from said circuit if said exciting arc is not established within a predetermined interval of time after the connection of said anode to said circuit.

4. The combination of an alternating current circuit, a vapor electric device comprising an anode and a cathode and provided with an exciting electrode arranged to produce a supply of ionized vapor in the vicinity of said cathode, means for regulating the temperature of said rectifier, a switch arranged to connect said anode to said circuit, means operable to produce closure of said switch and to produce temporary contact between said cathode and said exciting electrode at a predetermined value of said temperature, and means operable to break said contact when an exciting arc is established between said cathode and exciting electrode.

5. The combination of an alternating current circuit, a vapor electric device comprising an anode and a cathode and provided with an exciting electrode arranged to produce a supply of ionized vapor in the vicinity of said cathode, means for regulating the temperature of said rectifier, a switch arranged to connect said anode to said circuit, means operable to produce closure of said switch and to produce temporary contact between said cathode and said exciting electrode at a predetermined value of said temperature, means operable to break said contact when an exciting arc is established between said cathode and exciting electrode, and means operable to disconnect said anode from said circuit if said exciting arc is not established within a predetermined time interval after the connection of said anode to said circuit.

In witness whereof, I have hereunto set my hand this 15th day of October, 1926.

EUGENE L. HOUGH.